Dec. 24, 1968 M. R. DENISON 3,417,770

FLUID AMPLIFIER SYSTEM

Filed June 7, 1965

INVENTOR
MATHEW R. DENISON
BY
Allen E. Botney
ATTORNEY

United States Patent Office 3,417,770

Patented Dec. 24, 1968

3,417,770

FLUID AMPLIFIER SYSTEM

Mathew R. Denison, Tarzana, Calif., assignor to Electro-Optical Systems, Inc., Pasadena, Calif., a corporation of California Filed June 7, 1965, Ser. No. 461,956
21 Claims. (Cl. 137—81.5)

ABSTRACT OF THE DISCLOSURE

A multi-media fluid amplifier system where a first fluid flowing through a first fluid amplifier and jet pump controls the flow of a second fluid flowing through a second fluid amplifier by connecting the jet pump to the control channel of the second fluid amplifier.

Figure 1:
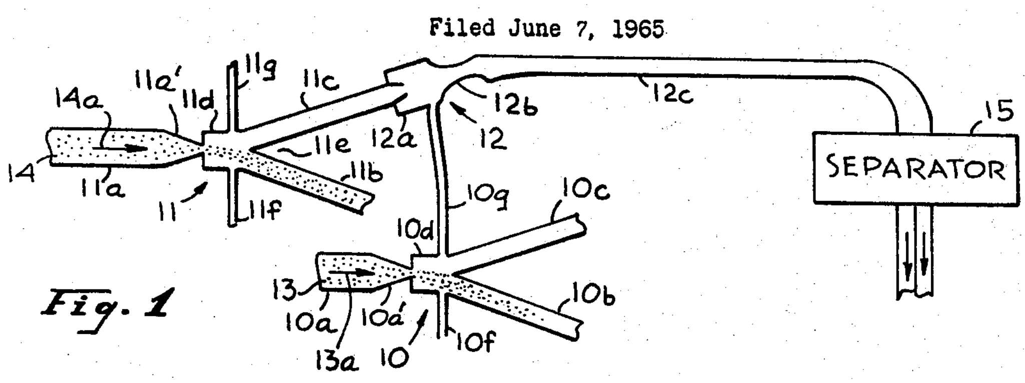

The present invention relates in general to the relatively new technology of fluidics, the term "fluidics" as used herein referring to that field of technology that deals with the use of fluids, either gaseous or liquid, in motion to perform functions such as signal or power amplification, logic or computation, control, and the like. More specifically, the present invention relates to a fluid amplifier system in which differential pressures are utilized against the sides of an elongated main fluid stream to control the direction of the stream.

Fluid devices are known wherein a relatively low-energy fluid input is made to impinge upon and thereby deflect a relatively high-energy fluid stream to a selectable outlet. Since the output flow is thus of greater energy than that of the input, these devices have been referred to in the art as "fluid amplifiers." These amplifiers are small, rugged, may be constructed of almost any material, such as plastic, metal, or ceramic, and basically comprise a plurality of fluid ducts formed within substantially solid bodies of material. Moreover, these devices possess the advantages of being inexpensive and, except for the fluid itself, of requiring no movable solid elements.

Fluid amplifiers are of various types. One such type is known as the stream interaction or momentum interchange type. In such an amplifier a power nozzle is supplied with pressurized fluid and issues a power jet or stream. A control nozzle directs fluid against the side of the power jet and deflects the power jet away from the control nozzle. Momentum is conserved in the system and the power jet will therefore flow at an angle with respect to its original direction such that the tangent of this angle is a function of the momentum of the control stream and the momentum of the power stream. It is thus possible to direct a high-powered jet toward or away from a target area in response to a control stream of lower power.

A further type of fluid amplifier is known as the boundary layer fluid amplifier. Boundary layer fluid amplifiers direct high-energy power jets directly toward a target area or receiving tube system, by pressure distribution in a power jet boundary layer region. This pressure distribution is controlled by the wall configuration of an interaction chamber, i.e., a chamber in which the power jet and control jets interact, as well as by power jet energy level, fluid transport effects, back-loading of the amplifier outputs, and the flow of control fluid through the power jet boundary layer region. In a boundary layer control fluid amplifier having two side walls on either side of a power jet, special design of the interaction chamber configuration assures that the power jet will lock on to one side wall, and remain in locked-on configuration even without control fluid flow. When the power jet is suitably deflected toward one side wall by a control fluid jet it can lock on to that side wall and remain in that locked-on configuration even after flow of the control fluid is terminated.

Hence, in the prior art, power jets may be deflected to one side or the other of the interaction chamber in response to a pulse of control jet pressure, and having been so deflected will remain in this deflected position, by virtue of boundary layer lock-on, until that position is disturbed by the application of sufficient pressure to an appropriate control jet which overcomes the lock-on and deflects the power jet toward the other side of the chamber.

The first type of fluid amplifier mentioned above is an analogue type of device since the degree of deflection of its power jet is proportional to the momentum of its control jet, whereas the second type of amplifier mentioned is a digital type of device because of its bistable or flip-flop nature. The present invention concerns itself with both types of amplifier devices since the performance characteristics and technologies that they have to offer highly recommend them for many different kinds of applications. More specifically, of the various possible uses of fluid control devices, one of the most intriguing is their application as the basis of a computer system. Thus, for example, since it gives a binary digital response, the type of device in which the stream locks onto one wall or the other is precisely suited for functioning as an all-around element for a digital computer. Again by way of example, process control is a practical area for fluidics since it offers the possibility of low-cost devices such as summers, integrators and function generators, which are difficult to mechanize in conventional pneumatics, especially where the use of carts and wheels is involved. Another area of application is in industrial control, in non-continuous processes like machining. Transit times involved are those of heavy objects, and fluidic systems offer the possibility of doing away with many of the transducers involved in going from microswitch circuits to pneumatic circuits to hydraulic circuits. It is thus seen from these few examples that by suitably adapting and combining these fluid amplifiers, large and varied systems can be built up from them.

However, there are applications in which it would be desirable to use more than one fluid in a fluid amplifier system. For example, in a computer-process control system, the process fluid can be used in one portion of the system, but in order to employ electrical inputs and outputs in another part, the fluid in the second portion of the system must be electrically conducting. Using the artificial heart pump developed in the field of medicine as a further example, it would certainly be desirable in such a case to control the flow of blood through the system by means of a second fluid, such as air or water. Accordingly, it is a principal object of the present invention to provide a fluid-amplifier system in which different fluids may be used in different parts of the system.

It is another object of the present invention to provide a fluid-amplifier system in which the flow of one fluid is under the control of the flow of another fluid.

It is further object of the present invention to provide a multi-media fluid-amplifier system in which the different fluids are effectively isolated from each other.

It is an additional object of the present invention to provide a fluid-amplifier system whose operation is not dependent on the impingement of control jets on the main fluid stream.

The aforementioned objects are achieved in the present invention by adapting the principles of a jet pump to conventional fluid amplifiers. More particularly, in an embodiment of the invention, a jet pump is coupled between a pair of fluid amplifiers with each amplifier having a different fluid circulating through it than the other.

An output channel from the first amplifier feeds directly into the jet pump which is thereby incorporated into this outlet channel. The second amplifier, on the other hand, is linked with the jet pump by means of a control channel which extends between the pump and the second amplifier's interaction chamber. In its operation, the fluid flowing through the pump from the first amplifier induces a suction in the aforesaid control channel that controls the fluid flow in the second amplifier. In the event any of the second fluid is drawn into the jet pump to mix with the first fluid, they can subsequently be separated from each other by any one of a number of well known techniques. Thus, by this means, two or more fluids can be used within a single fluid-amplifier system. In a closed-loop system the fluids should be immiscible for ease of separation. In an open-loop system, on the other hand, the mixed fluids would not be recirculated and, therefore, no means for fluid separation need be incorporated into the system. It should be mentioned that the other outlet channel of the first fluid amplifier may itself be coupled to a second jet pump which, in turn, could be used to share in the control of the second amplifier in the manner previously described or else to control the flow in still a third amplifier. Thus, by this means, two or more fluids can be used within a single fluid-amplifier system.

The novel features which are belived to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invention.

Figure 2:
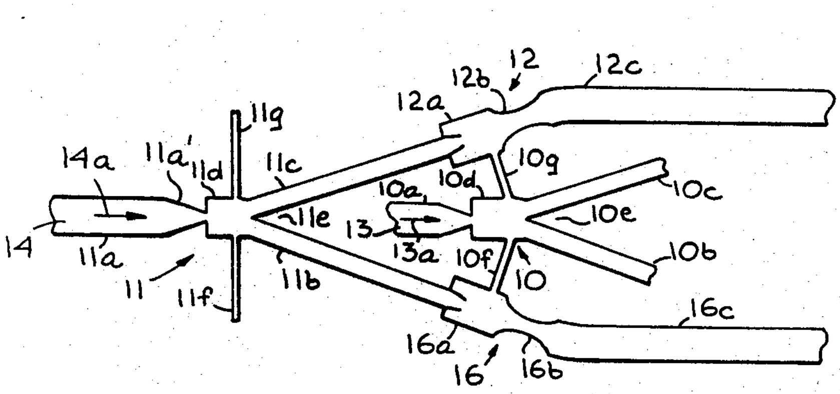
Figure 3:
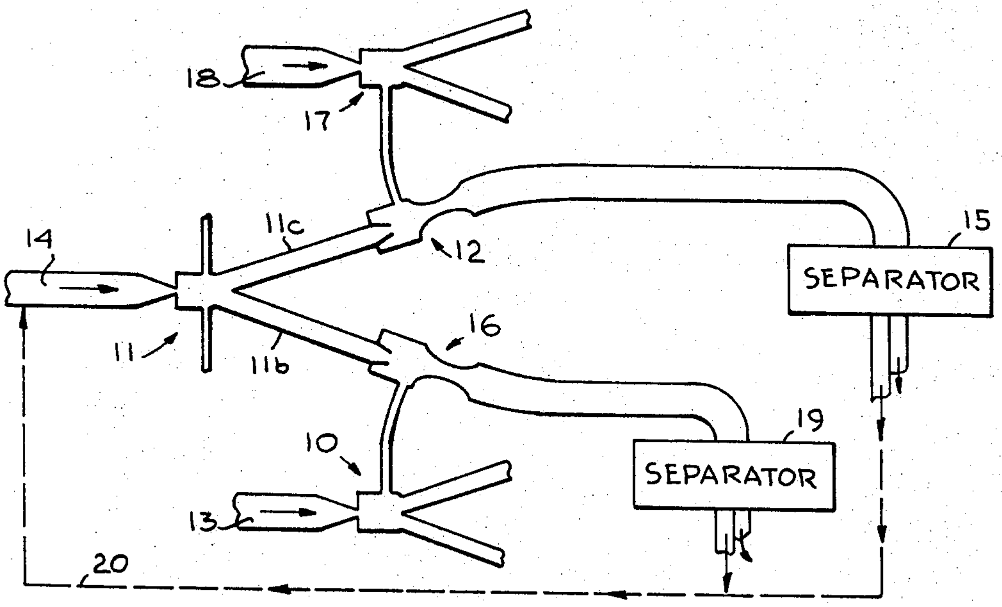

FIGURE 1 is a diagrammatic showing of the basic construction of a multi-media fluid-amplifier system according to the present invention;

FIGURE 2 diagrammatically illustrates one possible adaptation or arrangement of the FIG. 1 structure; and FIGURE 3 diagrammatically illustrates another possible adaptation or arrangement of the FIG. 1 structure.

For a consideration of the invention in detail, reference is now made to the drawing wherein like or similar parts or elements throughout the several figures are given like or similar designations. In FIG. 1 the embodiment is shown to include first and second fluid amplifiers, generally designated 10 and 11, and jet pump apparatus, generally designated 12, coupled between the amplifiers. Fluid amplifiers are already well known in the art, and detailed information relating to their construction and operation is readily available to the public as, for example, that presented in the article by O. Lew Wood and Harold L. Fox, entitled "Fluid Computers," published in the November 1963, issue of Science and Technology, pages 44–52 therein, and in the patent to Billy M. Horton entitled, "Fluid-Operated System," Patent No. 3,122,165 issued Feb. 25, 1964.

However, for sake of clarity, fluid amplifier 10 includes an inlet channel 10*a* and a pair of outlet channels 10*b* and 10*c*, the inlet and outlet channels thereof being intercoupled by a chamber 10*d* which may, in the present case, be of the boundary layer interaction kind or of the momentum interchange type. A pointed member 10*e*, known as a splitter, separates outlet channels 10*b* and 10*c* which are coupled to inlet channel 10*a* through chamber 10*d*. Finally, it should be mentioned that the forward end of inlet channel 10*a*, designated 10*a'*, tapers or narrows to form a nozzle at the entrance to the chamber. In the same way, fluid amplifier 11 includes an inlet channel 11*a* and a pair of outlet channels 11*b* and 11*c*, the inlet and outlet channels here being intercoupled by means of a chamber 11*d* which likewise may be either of the boundary layer interaction or of the momentum interchange kind. Here again, inlet channel 11*a* is tapered at its forward end, as indicated at 11*a'*, to form a nozzle that communicates with chamber 11*d*. Finally, the pointed member between outlet channels 11*b* and 11*c*, namely, the splitter, is designated 11*e*.

With respect to jet pump apparatus 12, jet pump devices are well known in the pneumatic or fluid-flow arts and, therefore, a lengthy and detailed explanation of them is not deemed essential. Accordingly, suffice it to say that apparatus 12 includes a chamber 12*a* which, at one end, encloses the forward end of one of the outlet channels of fluid amplifier 11, and, at the other end, feeds into or, stated differently, communicates with, a constricted portion or neck 12*b*. Constricted portion 12*b* leads into a wider channel 12*c* constituting the output end of the jet pump apparatus. In FIG. 1, outlet channel 11 has been selected to couple with jet pump chamber 12*a* and, as shown in the figure, that portion of channel 11*c* that is enclosed by the chamber is tapered to form a nozzle 11*c'*.

Also included in the FIG. 1 system are the fluids that flow therethrough and, as a matter of fact, in this invention the fluids constitute a significant part of the invention. Thus, a first fluid 13 flows through amplifier 10 in the general direction of arrow 13*a*, and a second fluid 14 that is different than fluid 13 flows through amplifier 11 in the general direction of arrow 14*a*. By way of example, fluid 14 may be a liquid metal, mercury, whereas fluid 13 may be air or water. However, it should be mentioned that air or water may also be used as fluid 14, in which case something other than water or air would be used as fluid 13. The point that needs to be emphasized is that, in accordance with the present invention, fluids 13 and 14 are dissimilar.

Completing the FIG. 1 structure are a pair of narrow control channels 10*f* and 10*g* coupled to the chamber of amplifier 10 and a pair of narrow control channels 11*f* and 11*g* coupled to the chamber of amplifier 11. More specifically, control channels 10*f* and 10*g* connect or link with opposite sides of chamber 10*d* while control channels 11*f* and 11*g* connect or link with opposite sides of chamber 11*d*. As shown in the figure, channel 10*g* also couples to jet pump 12 and it does so by entering or opening into chamber 12*a* thereof in front of or just before constriction 12*b*. It will be recognized by those skilled in the art that control channels 10*f*, 11*f* and 11*g* also couple to other pieces of apparatus, but that such other couplings need not be shown for present purposes. However, some possible connections for control channel 10*f* will be presented in FIGS. 2 and 3 and discused below.

Considering now the operation of the FIG. 1 system, it will initially be assumed for purposes of discussion that fluid amplifiers 10 and 11 are of the boundary-layer type by which is meant that chambers 10*d* and 11*d* therein are interaction chambers. With this in mind, a high-energy stream of fluid 13, the power stream is pumped into inlet channel 10*a* at one end and flows through this channel in the direction of arrow 13*a*. As the fluid stream passes through nozzle 10*a'* and enters interaction chamber 10*d*, it entrains air from both sides, and this pick-up of air along the stream's sides causes the pressure to drop in the zones between the stream and the walls of the chamber. The resulting pressure difference creates an unstable situation in that the higher pressure of the surroundings (ambient pressure) pushes air back into the low-pressure zones on both sides of the stream to equalize the pressure.

However, some disturbance or asymmetry, such as, for example, in the shape of the chamber usually exists that causes the equalizing return flow of air to push the stream toward one wall, and as the zone between the stream and that wall narrows, there is less room for the admittance of counter-flow to replace the air being entrained by the stream on that side. Consequently, the comparative pressure in the zone drops further, and very quickly thereafter the stream moves over against the wall, with the result that the power stream is directed through the outlet channel nearest said one wall. Moreover, it stays locked onto that wall as long as the power stream keeps flowing, because on the wall side a region of low pressure persists near the nozzle, whereas on the opposite side of the stream the ambient pressure pushes the stream toward that region. This is the situation or state of affairs presented in FIG. 1 for amplifier 10 wherein fluid 13 constituting the power stream in this amplifier is shown locked against the chamber wall nearest outlet channel 10*b*, with the result that fluid 13 is thereby directed through outlet channel 10*b*.

Since amplifier 11 is of the same kind as amplifier 10, the same kind of operation may therefore be expected for amplifier 11 as for amplifier 10. Accordingly, the explanations presented above with respect to amplifier 10 are equally applicable to amplifier 11. Hence, it will initially be assumed that fluid 14 entering inlet channel 11*a* has ultimately locked onto the wall of chamber 11*d* that is nearest outlet channel 11*b* and, consequently, that fluid 14 is flowing through outlet channel 11*b*. As a result, no fluid 14 is flowing through jet pump 12 at this time. Now, if it is desired to switch the flow of fluid 13 from outlet channel 10*b* to outlet channel 10*c*, then, in accordance with the present invention, it is first necessary to switch the flow of fluid 14 from outlet channel 11*b* to outlet channel 11*c*. This can be done, for example, by sending a pulse of fluid of sufficient force, called a control jet, through control channel 11*f* and against the near side of the power stream in chamber 11*d*. When this is done, the power stream is released and thereafter swings over to the opposite side of the chamber to lock onto the wall there, with the result that fluid 14 then exits through outlet channel 11*c* as desired.

It will be obvious that with fluid 14 flowing through outlet channel 11*c*, it also now flows through jet pump apparatus 12, and when this occurs, a suction is created or induced in control channel 10*g* that is sufficient to cause the power stream in chamber 10*d* to swing over to the opposite side of the chamber, lock onto the wall there, and then exit through outlet channel 10*c*. As will be recognized by those skilled in the art, the suction is primarily due to constriction 12 which causes fluid 14 to flow through that area at a much higher velocity, thereby creating a low-pressure area in jet pump chamber 12*a* in the proximity of control channel 10*g*. However, once power stream 13 has locked onto the wall nearest outlet chamber 10*c*, it remains locked on even though the suction pressure in control channel 10*g* is reduced to zero, which will be the case if power stream 14 is switched to outlet channel 11*b*.

It should be mentioned that as a result of this suction pressure, some of fluid 13 will be drawn up into channel 10*g* and may enter jet pump 12 to mix with fluid 14. If this occurs, and if necessary, the two fluids can then be separated from each other by any one of a number of known techniques. Separator equipment 15 is shown for this reason in FIG. 1, and, as shown, is coupled to the output of the jet pump, namely, tube or channel 12*c*. As previously suggested, the fluids are preferably immiscible in a closed-loop system for ease of separation, but in an open-loop system, the mixed fluids would not be recirculated and, therefore, no means for fluid separation need be incorporated into the overall system.

To switch power stream 13 from outlet channel 10*c* back to outlet channel 10*b*, is is only necessary to reverse the process previously described by inducing a suitable suction pressure in control channel 10*f*. This may be achieved in the manner illustrated in FIG. 2 to which reference is now made. Thus, as is shown there, a second jet pump structure 16 is coupled between amplifiers 10 and 11, its chamber 16*a* enclosing outlet channel 11*b* and communicating with control channel 10*f* in the same manner as chamber 12*a* with outlet channel 11*c* and control channel 10*g*. Hence, when power stream 14 in amplifier 11 is switched to outlet channel 11*b*, and this can be done by applying a suitable control jet to the power stream via control channel 11*g*, fluid 14 flows through jet pump 16 and, therefore, for the reasons previously given in connection with jet pump apparatus 12, a suction is applied through control channel 10*f* to power stream 13 which will now switch over to outlet channel 10*b* in response to this suction pressure. It is thus seen that by alternating the flow of fluid 14 between outlet channels 11*b* and 11*c* and, therefore, between jet pumps 16 and 12, respectively, the flow of fluid 13 in amplifier 10 is likewise alternated between outlet channels 10*b* and 10*c* and that this is accomplished without any of fluid 14 entering amplifier 10 to mix with fluid 13 therein. Consequently, in accordance with the objectives of the present invention, a multi-media fluid-amplifier system is thereby provided.

As was shown in FIG. 2, a pair of jet pumps may be used to control the flow of fluid between the outlet channels of a single fluid amplifier. However, they may instead be used to influence the flow of fluids in a pair of amplifiers, as is illustrated in FIG. 3 wherein, as before, outlet channels 11*b* and 11*c* respectively fed into jet pumps 16 and 12. In this case, though, instead of the jet pumps being linked with a single amplifier, namely, amplifier 10, they are respectively linked instead with a pair of amplifiers, namely, amplifiers 10 and 17. Hence, by switching fluid 14 between outlet channels 11*b* and 11*c*, the flow of fluid 13 in amplifier 10 and fluid 18 in amplifier 17 may likewise be switched, as was previously described in connection with the structure of FIG. 1. Fluids 13 and 18 may be of the same kind or of different kinds but, in any event, they are dissimilar from fluid 14. It is thus seen that by means of the present invention a rather complex multi-media fluid amplifier system may be built up. Should it be necessary to separate fluids 13 and 18 from fluid 14, then standard separator equipment 15 and 19 may be used for this purpose, with separator 15 being coupled as before to the output of jet pump 12 and separator 19 being coupled to the output of jet pump 16. The fluid outputs from these separators may then be properly recombined and fed back to the input end of the entire system, as is indicated by the series of arrows designated 20.

As was mentioned earlier, boundary layer types of amplifiers were used here to explain the principles and details of the invention and embodiments thereof. However, the principles of the present invention are equally applicable to the momentum interchange type of amplifier in which proportional control of the power stream is obtained, that is to say, in which the degree of the deflection of the power stream is proportional to the momentum of the control jet or, stated otherwise, proportional to the control pressure or force. Basically, the difference in the two types of amplifiers lies in the design of the amplifiers' chamber, and a full discussion of this in detail, including drawings and illustrations of various kinds, is set out in the article by Stanley W. Angrist entitled "Fluid Control Devices," published in the December 1964, issue of Scientific American, vol. 211, No. 6, pages 81–88.

Although a number of particular arrangements of the invention have been illustrated above by way of example, it is not intended that the invention be limited thereto. Accordingly, the invention should be considered to include any and all modifications, alterations or equivalent arrangements falling within the scope of the annexed claims.

Having thus described the invention, what is claimed is:

1. A fluid-amplifier system comprising: a fluid amplifier through which a first fluid flows in a power stream, said amplifier having a pair of outlet channels through which said power stream is selectively directed; and means coupled to said fluid amplifier for deflecting said power stream from one to the other of said outlet channels, said means including a pair of jet pump means through which a second fluid selectively flows and which communicate with said fluid amplifier on opposite sides of the power stream thereof for selectively applying course-deflecting, suction pressure thereto.

2. The fluid-amplifier system defined in claim 1 further including a second fluid amplifier through which said second fluid flows in a power stream, said second fluid amplifier having a pair of outlet channels respectively coupled to said pair of jet pumps; and control means for selectively directing the power stream of said second amplifier from one to the other of its outlet channels.

3. A fluid-amplifier system comprising: first and second fluid amplifiers through which a first fluid flows in first and second power streams, respectively, each of said first and second amplifiers having a pair of outlet channels through which its power stream is selectively directed; first and second jet pump means respectively coupled to said first and second fluid amplifiers and through which a second fluid selectively flows, said first and second jet pump means being operable in response to the flow of said second fluid therethrough to deflect the power streams in said first and second amplifiers from one to the other of their outlet channels; and means for selectively directing said second fluid through said first and second jet pump means.

4. The combination comprising a fluid amplifier having an input channel through which fluid flows in a power stream and a plurality of output channels through which said power stream is selectively directed, and means connected to one of said output channels and having a passageway substantially perpendicular to the direction of fluid flow through said means, said means adapted to produce suction pressure in said passageway when said power stream flows through said output channel and said suction pressure producing means connected thereto.

5. The combination of claim 4 wherein said suction pressure producing means comprises jet pump means.

6. The combination of claim 4 wherein said suction producing means comprises a chamber having an inlet operatively connected to said output channel and an outlet having a constriction therein for increasing the velocity of fluid flow therethrough, said passageway being connected to said chamber between said inlet and said constriction.

7. The combination of claim 6 further including a second suction pressure producing means connected to another of said output channels and adapted to produce suction pressure in a second passageway substantially perpendicular to the direction of fluid flow through said output channel and said second suction pressure producing means connected thereto.

8. A fluid amplifier system comprising: first and second fluid amplifiers through which first and second fluids respectively flow; means connected to the output of said first fluid amplifier and through which said first fluid flows, said means coupled to said second fluid amplifier and adapted to produce a course-deflecting suction pressure against said second fluid flowing therein in response to the flow of said first fluid through said means.

9. A fluid amplifier system comprising first and second fluid amplifiers through which first and second fluids respectively flow, jet pump means connected to the output of said first fluid amplifier and through which said first fluid flows, said jet pump means communicating with said second fluid amplifier and operable in response to the flow of said first fluid therethrough to apply a course-deflecting force to said second fluid flowing through said second fluid amplifier.

10. A fluid amplifier system comprising first and second fluid amplifiers through which first and second fluids resectively flow, each of said amplifiers having at least first and second outlet channels through which its fluid selectively flows; jet pump means coupled directly to the first outlet channel of said first fluid amplifier and through which said first fluid flows when it is flowing in said first outlet channel, and a control channel extending between said jet pump means and said second fluid amplifier for having produced therein a course-deflecting, suction pressure force against said second fluid flowing through said second amplifier when said first fluid is flowing through said jet pump means.

11. A fluid amplifier system comprising first and second fluid amplifiers through which first and second fluids respectively flow in first and second power streams, each of said first and second fluid amplifiers having at least a pair of outlet channels through which its power stream is selectively directed, a third fluid amplifier through which a third fluid flows in a power stream, said third fluid amplifier having at least a pair of outlet channels through which its power stream is selectively directed; and first and second jet pump means respectively coupled to the outlet channels of said third fluid amplifier, said first and second jet pump means respectively coupled to said first and second fluid amplifiers and operable in response to the flow of said third fluid therethrough to apply a suction pressure, course-deflecting force to deflect the power streams in said first and second fluid amplifiers from one to the other of said outlet channels.

12. A fluid amplifier system having a first fluid amplifier through which a first fluid flows, said fluid amplifier comprising an input channel, a plurality of output channels and at least two control channels substantially perpendicular to the direction of fluid flow as it enters said first fluid amplifier; a second fluid amplifier through which a second fluid flows, said second fluid amplifier comprising an input channel, a plurality of output channels and at least two control channels substantially perpendicular to the direction of fluid flow as it enters said second fluid amplifier; and jet pump means connected to an outlet channel of said first fluid amplifier and a control channel of said second fluid amplifier whereby fluid flow through said jet pump means causes deflection of fluid flow in said second fluid amplifier to the output channel of said second fluid amplifier adjacent said control channel to which said jet pump means is connected if fluid flow in said second fluid amplifier is not already flowing through said output channel.

13. The fluid amplifier system of claim 12 further including means for selectively applying fluid pressure to at least one of said first fluid amplifier control channels.

14. The fluid amplifier system of claim 12 further including means to flow a first fluid through said first fluid amplifier and means to flow a second fluid through said second fluid amplifier.

15. The fluid amplifier system of claim 14 wherein said first fluid and said second fluid are different.

16. The fluid amplifier system of claim 12 wherein said jet pump means comprises means for producing a suction pressure in said control channel to which it is connected.

17. The fluid amplifier system of claim 12 wherein said jet pump means comprises a chamber having an inlet operatively connected to said outlet channel of said first fluid amplifier and an outlet having a constriction therein for increasing the velocity of fluid flow therethrough, said control channel of said second fluid amplifier operatively connected to said chamber for having produced therein a suction pressure when fluid is flowing through said jet pump means.

18. The fluid amplifier system of claim 17 wherein said control channel is substantially perpendicular to the direction of fluid flow through said jet pump means.

19. The fluid amplifier system of claim 17 wherein said control channel is connected to said chamber between said inlet and said constriction.

20. A fluid amplifier system having a first fluid amplifier through which a first fluid flows, said fluid amplifier comprising an input channel, a plurality of output channels and at least two control channels substantially perpendicular to the direction of fluid flow as it enters said first fluid amplifier; a second fluid amplifier through which a second fluid flows, said second fluid amplifier comprising an input channel, a plurality of output channels and at least two control channels substantially perpendicular to the direction of fluid flow as it enters said second fluid amplifier; first jet pump means connected to an output channel of said first fluid amplifier and a control channel of said second fluid amplifier; and second jet pump means connected to a second output channel of said first fluid amplifier and a second control channel of said second fluid amplifier.

21. The fluid amplifier system of claim 20 wherein fluid flow through said first jet pump means causes deflection of fluid flow in said second fluid amplifier to a first output channel of said second fluid amplifier adjacent said control channel to which said first jet pump means is connected if fluid flow in said second fluid amplifier is not already flowing through said first output channel, and whereby fluid flow through said second jet pump means causes deflection of fluid flow in said second fluid amplifier to a second output channel of said second fluid amplifier adjacent said control channel to which said second jet pump means is connected if fluid flow in said second fluid amplifier is not already flowing through said second output channel.

References Cited

UNITED STATES PATENTS

| | | | |
|---|---|---|---|
| 3,022,743 | 2/1962 | Engholdt | 103—258 |
| 3,072,147 | 1/1963 | Allen et al. | 137—81.5 |
| 3,148,691 | 9/1964 | Greenblott | 137—81.5 |
| 3,212,515 | 10/1965 | Zisfein et al. | 137—81.5 |
| 3,232,095 | 2/1966 | Symnoski et al. | 137—81.5 |
| 3,232,305 | 2/1966 | Groeber | 137—81.5 |
| 3,250,116 | 5/1966 | Hatch | 137—81.5 XR |
| 3,266,513 | 8/1966 | Voit | 137—81.5 |
| 3,270,960 | 9/1966 | Phllips. | |
| 3,277,914 | 10/1966 | Manion | 137—81.5 |
| 3,289,594 | 12/1966 | Thiele | 103—258 XR |

FOREIGN PATENTS

| | | |
|---|---|---|
| 896,302 | 11/1953 | Germany. |

SAMUEL SCOTT, *Primary Examiner.*

U.S. Cl. X.R.

103—263